United States Patent
Herr

(10) Patent No.: US 10,696,470 B2
(45) Date of Patent: Jun. 30, 2020

(54) GAS DELIVERY DEVICE AND GAS DELIVERY APPARATUS

(71) Applicant: J&N Tactical LLC, South Haven, MN (US)

(72) Inventor: Jeffrey Herr, South Haven, MN (US)

(73) Assignee: J&N TACTICAL LLC, South Haven, MN (US)

( * ) Notice: Subject to any disclaimer, the term of this patent is extended or adjusted under 35 U.S.C. 154(b) by 0 days.

(21) Appl. No.: 16/000,478

(22) Filed: Jun. 5, 2018

(65) Prior Publication Data

US 2019/0009975 A1 Jan. 10, 2019

Related U.S. Application Data

(60) Provisional application No. 62/515,118, filed on Jun. 5, 2017.

(51) Int. Cl.
| | |
|---|---|
| *B65D 83/68* | (2006.01) |
| *B65D 83/38* | (2006.01) |
| *F41H 9/04* | (2006.01) |
| *F42B 12/46* | (2006.01) |
| *B01J 7/00* | (2006.01) |
| *F42B 12/54* | (2006.01) |
| *B60R 21/12* | (2006.01) |

(52) U.S. Cl.
CPC .............. *B65D 83/68* (2013.01); *B01J 7/00* (2013.01); *B65D 83/384* (2013.01); *F41H 9/04* (2013.01); *F42B 12/46* (2013.01); *F42B 12/54* (2013.01); *B60R 21/12* (2013.01)

(58) Field of Classification Search
CPC .......... B65D 83/68; B65D 83/384; B01J 7/00; F41H 9/04; F42B 12/46; F42B 12/54; B60R 21/12

USPC ............................................ 89/1.11; 222/3
See application file for complete search history.

(56) References Cited

U.S. PATENT DOCUMENTS

| | | | | | |
|---|---|---|---|---|---|
| 2,094,261 | A | * | 9/1937 | Burley | B60R 21/12 109/32 |
| 3,640,083 | A | * | 2/1972 | Galbraith | B01J 7/00 62/48.4 |
| 3,877,882 | A | * | 4/1975 | Lette | B01J 7/00 422/164 |
| 3,958,949 | A | * | 5/1976 | Plantif | B01J 7/00 422/166 |
| 5,415,246 | A | * | 5/1995 | Cooper | B60R 25/04 180/287 |
| 5,703,563 | A | * | 12/1997 | Abe, Jr. | B60R 25/00 180/287 |
| 7,762,897 | B2 | * | 7/2010 | Starr | F21S 10/04 40/427 |

(Continued)

OTHER PUBLICATIONS

Photographs of first public disclosure of gas delivery system at trade show, Apr. 10, 2017 (5 pages).

*Primary Examiner* — Samir Abdosh

(74) *Attorney, Agent, or Firm* — Hamre, Schumann, Mueller & Larson, P.C.

(57) ABSTRACT

A gas delivery device configured to be inserted into a structure. The gas delivery device also being configured to be attached to a vehicle. The gas delivery device including a housing and a canister rack disposed within the housing. The canister rack being configured to hold two or more chemical agent canisters. A gas delivery apparatus including a gas delivery device and triggering device is also disclosed.

20 Claims, 6 Drawing Sheets

(56) References Cited

U.S. PATENT DOCUMENTS

| | | | | |
|---|---|---|---|---|
| 8,636,096 B2* | 1/2014 | Kim | ................. | B25J 11/002 180/21 |
| 2006/0275721 A1* | 12/2006 | Starr | ................. | F21S 10/04 431/125 |
| 2013/0133544 A1* | 5/2013 | Wang | ................. | B01J 7/00 102/530 |

* cited by examiner and a gas distributing device that is attached to the motor vehicle. The gas distributing device including a housing and a gas canister rack that is disposed within the housing. The gas canister rack is configured to hold two or more chemical agent canisters.

GAS DELIVERY DEVICE AND GAS DELIVERY APPARATUS

FIELD

This disclosure relates to the field of chemical agent distributing equipment. Specifically, this description relates to devices that are configured to distribute one or more chemical agents within a structure.

BACKGROUND

For military and law enforcement personal, an armed suspect may barricade themselves within a structure. The structure may be, for example, a vehicle, a building, or a house. Military and law enforcement personal may be required to use chemical agent to force the armed suspect to leave the barricaded structure and/or surrender. However, this requires individually inserting gas canisters that produce the chemical agent into the barricaded structure. This can require a large number of gas canisters to produce enough chemical agent to force the suspect to leave the barricaded structure and/or surrender.

SUMMARY

This application describes a gas delivery device. Specifically, the embodiments of the gas delivery device allow an operator to efficiently and safely release one or more chemical agents into a barricaded structure. In an embodiment, the gas delivery device is attached to a vehicle such that an operator may forcefully insert the gas delivery device into a structure from a safe area (e.g., a remote area, inside an armored vehicle, etc.).

The embodiments described herein include a housing including at least two or more chemical agent canisters. The embodiments described herein allow an operator to safely insert the housing into a structure. The embodiments also allow an operator to remotely release chemical agent from the two or more gas canisters into the structure. This allows the operator to release a chemical agent within the structure without being exposed to an armed suspect. For example, the operator may remotely release the chemical agent from within an armored truck. Further, the embodiments described herein allows an operator to utilize a continuum of escalating force as a response to the barricaded suspect while the operator is in a safe position.

In some embodiments, a gas delivery device configured to be inserted into a structure is provided. The device including a housing and a canister rack configured to hold two or more chemical agent canisters. The canister rack being disposed within the housing. The device also being configured to be attached a vehicle.

In an embodiment, the gas delivery device further includes a ventilation device. The ventilation device blows the chemical agent produced by the one or more of the chemical agent canisters out of the housing.

In some embodiments, a gas delivery apparatus is provided. The apparatus includes a gas delivery device and a triggering device. The gas delivery device includes a housing and a canister rack disposed within the housing. The canister rack being configured to hold two or more nonlethal gas canisters. The triggering device is configured to initiate the two or more canisters held by the canister rack. The device is configured to be attached to a vehicle.

In some embodiments, a gas distributing vehicle is provided. The gas distributing vehicle includes a motor vehicle and a gas distributing device that is attached to the motor vehicle. The gas distributing device including a housing and a gas canister rack that is disposed within the housing. The gas canister rack is configured to hold two or more chemical agent canisters.

In some embodiments, a method of utilizing a gas delivery device is provided. The method utilizes a continuum of escalating force. The method includes inserting the gas delivery device into a structure. The method also includes initiating one or more chemical agent canisters disposed within the gas delivery device to distribute a chemical agent into the structure.

In an embodiment, a method of utilizing the gas delivery device includes initiating one or more noise-flash diversionary devices ("NFDD"). In an embodiment, the gas delivery device includes an electronic audio device such as a speaker or siren, and the method includes communicating to a suspect via the electronic audio device.

DETAILED DESCRIPTION

In the following detailed description, reference is made to the accompanying drawings that form a part thereof, and in which is shown by way of illustration specific illustrative embodiments in which the invention may be practiced. These embodiments are described in sufficient detail to enable those skilled in the art to practice what is claimed, and it is to be understood that other embodiments may be utilized without departing form the spirit and the scope of the claims. The following detailed description is, therefore, is not to be taken in a finite sense.

When individual gas canisters are utilized against a barricaded suspect, they can present a fire hazard as they can contact and ignite flammable materials within the structure. Previously, a device punctures a side of the structure and sprays liquid inside of the structure and the liquid evaporates to produce the chemical agent. However, this liquid can permanently damage the surfaces of the structure. The embodiments described herein include a gas delivery device that can hold one or more canisters so as to minimize the possible risk of a fire. Further, the embodiments described herein minimize the amount of damage caused to the internal surfaces of a structure by distributing a gas that does not permanently damage the internal surfaces of the structure.

The embodiments described herein are directed to a gas delivery device that allows an operator (e.g., a police officer, or military personnel) to efficiently and safely distribute a chemical agent into a barricaded structure. Specifically, embodiments described herein allow a gas delivery device to be attached to a vehicle. In certain embodiments, the vehicle may forcibly insert the gas delivery device into a structure. The structure may be, for example, a vehicle, a building, a house, etc. For example, the vehicle may push the gas delivery device through a structural weak point of a structure, such as the window of a vehicle or building, or the siding of a building. Once inserted into the structure, the gas delivery device may release one or more chemical agents into the structure. The gas delivery device allows an operator to insert and release a chemical agent into a structure without exposing the operator to armed and/or dangerous enemy combatants or criminals. For example, the vehicle may be an armored vehicle and the operator may insert and/or operate the gas delivery device from within the safety of the armored vehicle, or the vehicle may be a remotely controlled vehicle.

FIGS. 1-5 illustrate an embodiment of a gas delivery device 100, according to one embodiment. The gas delivery device includes a housing 102, an insertion head 104, and a connecting member 106. The housing 102 has a rectangular prism shape in this embodiment. However, the housing 102 does not require a specific shape. For example, in other embodiments, the housing 102 may have a cube, cylindrical, and/or triangular shape.

Figure 1:
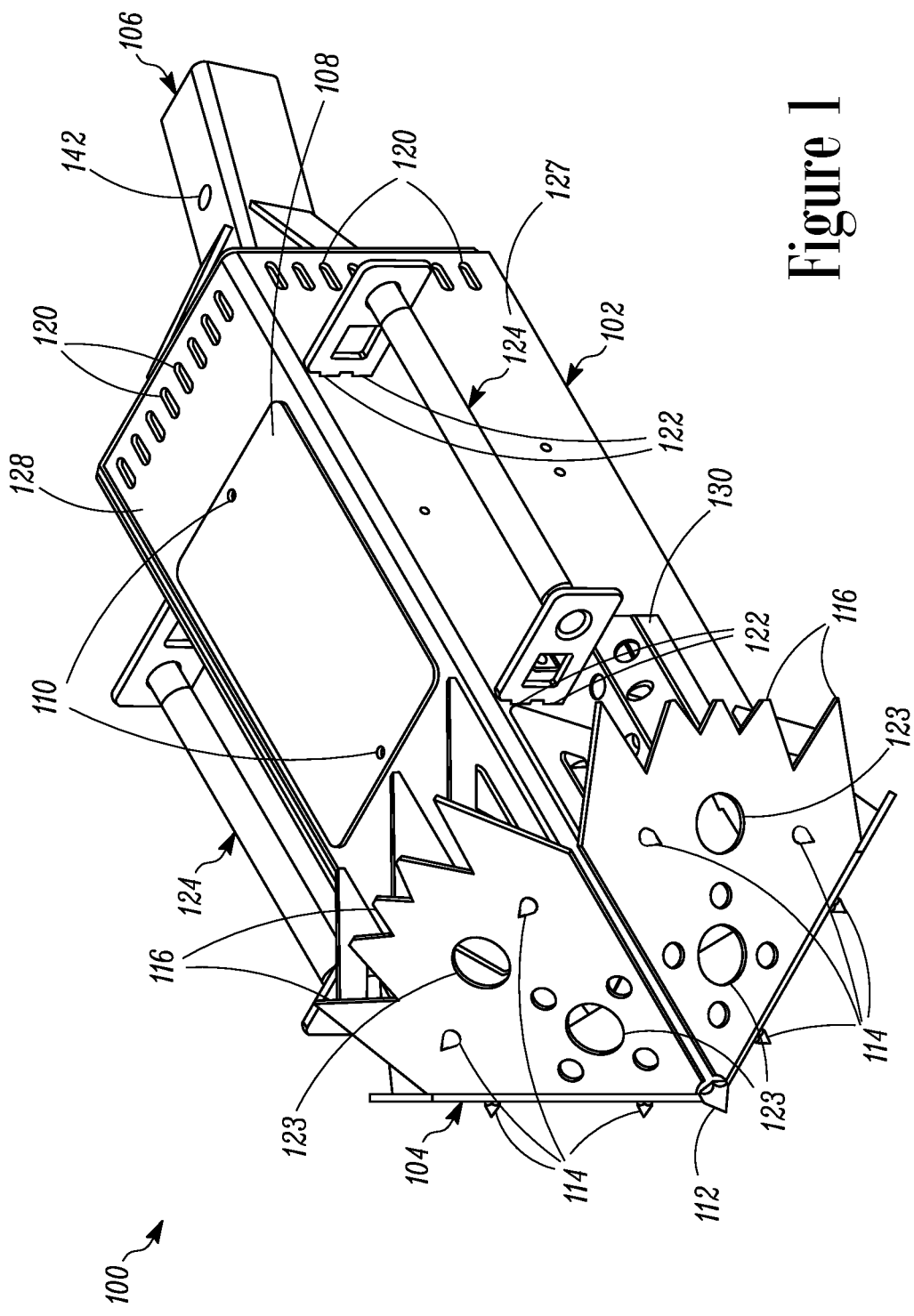
FIG. 1 shows a perspective view of a gas delivery device according to one embodiment.
Figure 2:
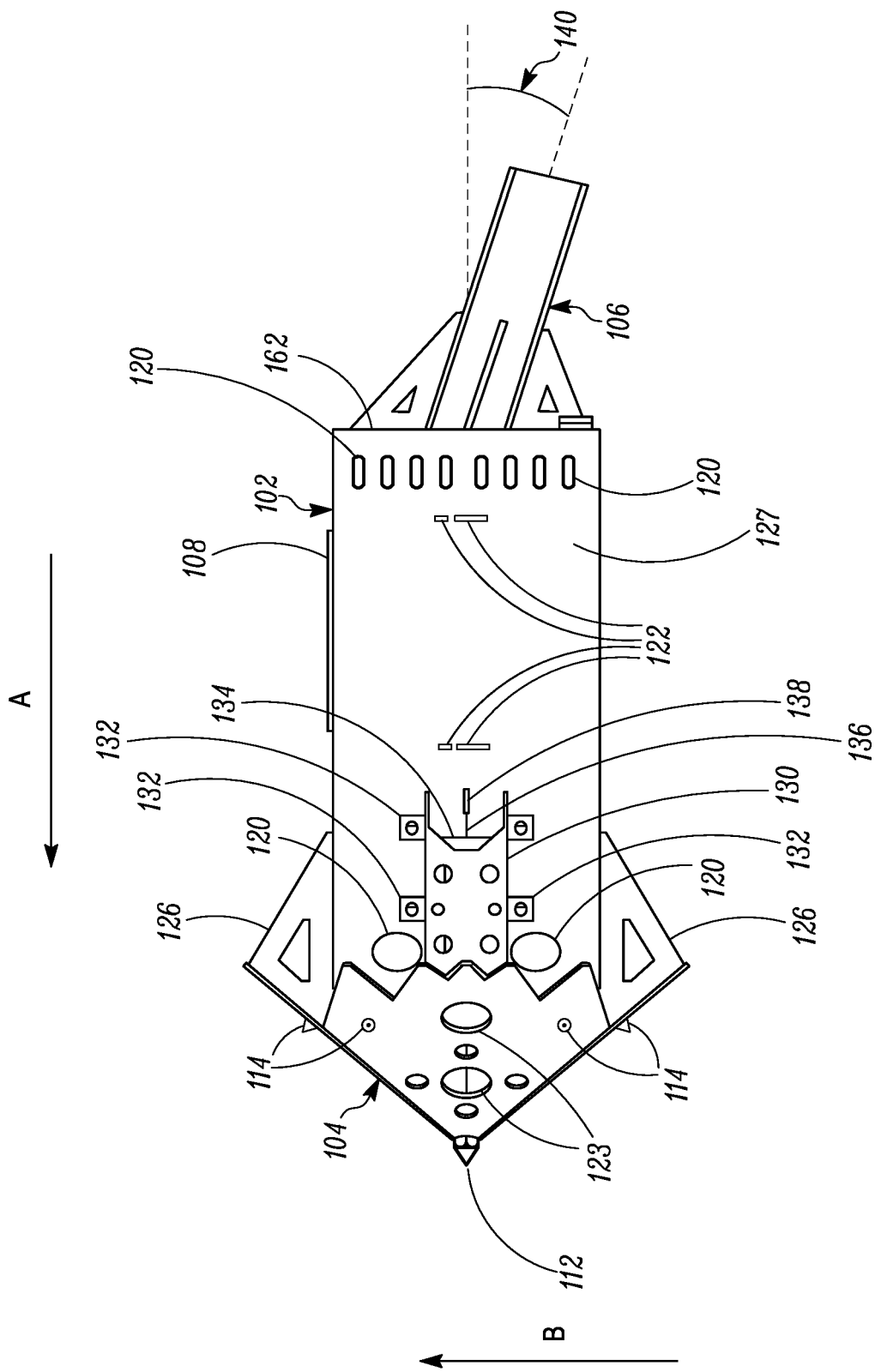
FIG. 2 is a side elevational view of the gas delivery device shown in FIG. 1 without handles.
Figure 3:
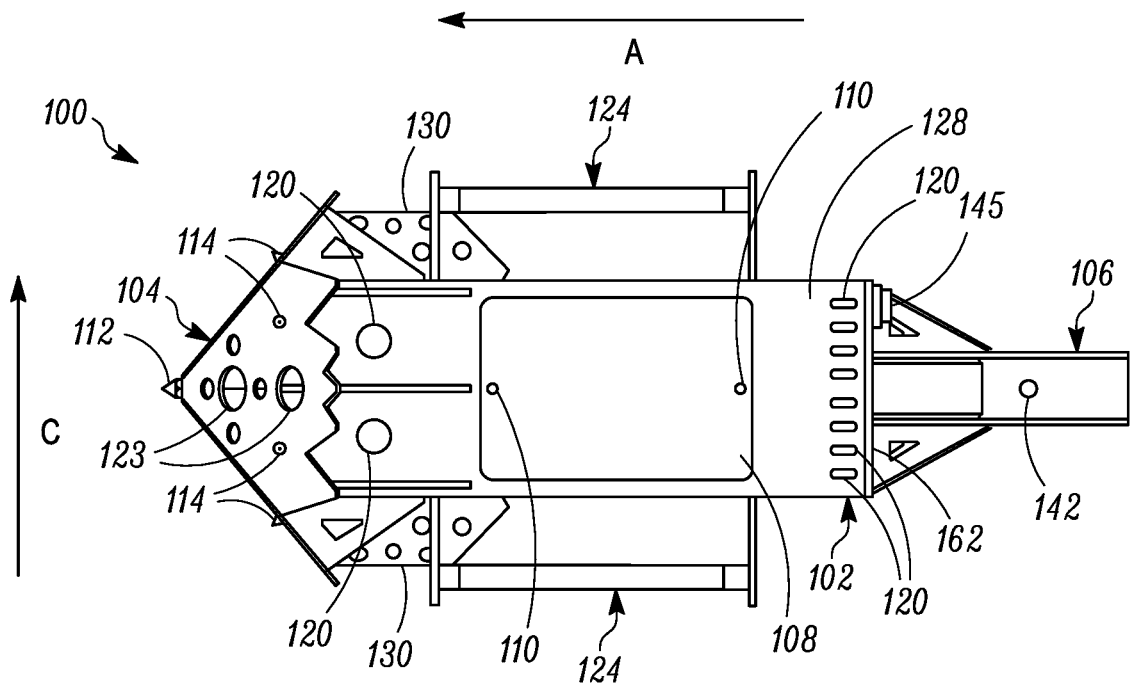
FIG. 3 is a top elevational view of the gas delivery device shown in FIG. 1.

Referring to FIGS. 1-3, the housing 102 includes a removable cover 108 that allows an operator to access the interior of the housing 102. The removable cover 108 is secured to the housing 102 so that it cannot be easily removed. In this embodiment, the removable cover 108 is secured by two bolts 110. The interior of the housing 102 and its contents will be explained in more detail below. It should be appreciated that, in an embodiment, the removable cover may be located on another surface (e.g., the bottom 129, sides 127, front 160, and/or back 162) of the housing 102.

Figure 4:
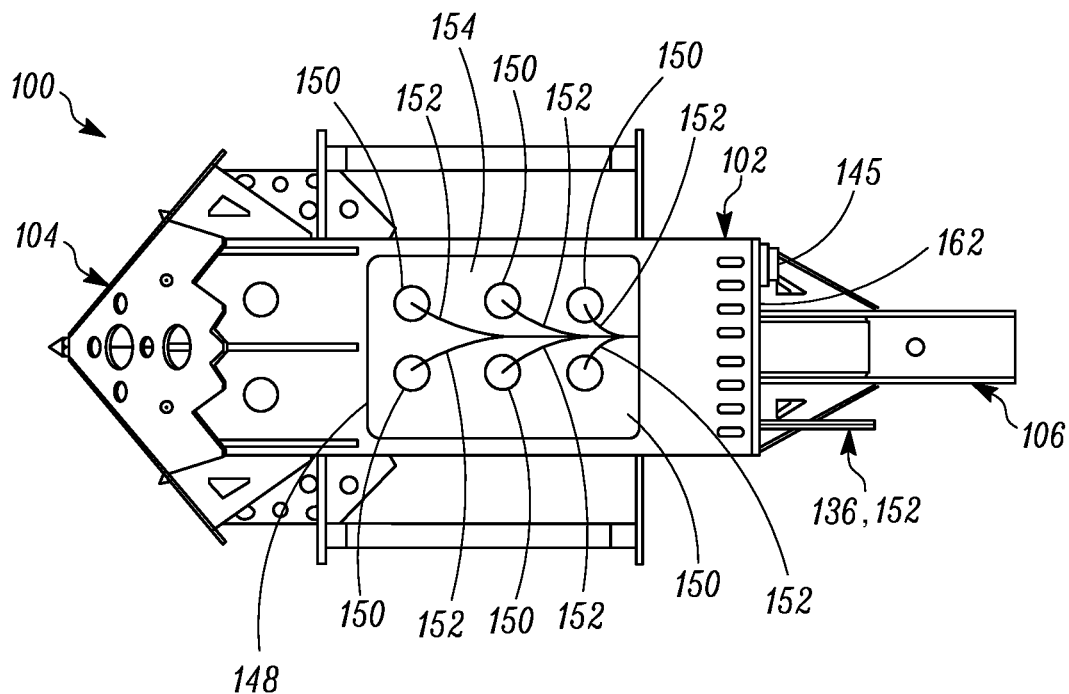
FIG. 4 is a top elevational view of the gas delivery device shown in FIG. 1 without a cover.
Figure 5:
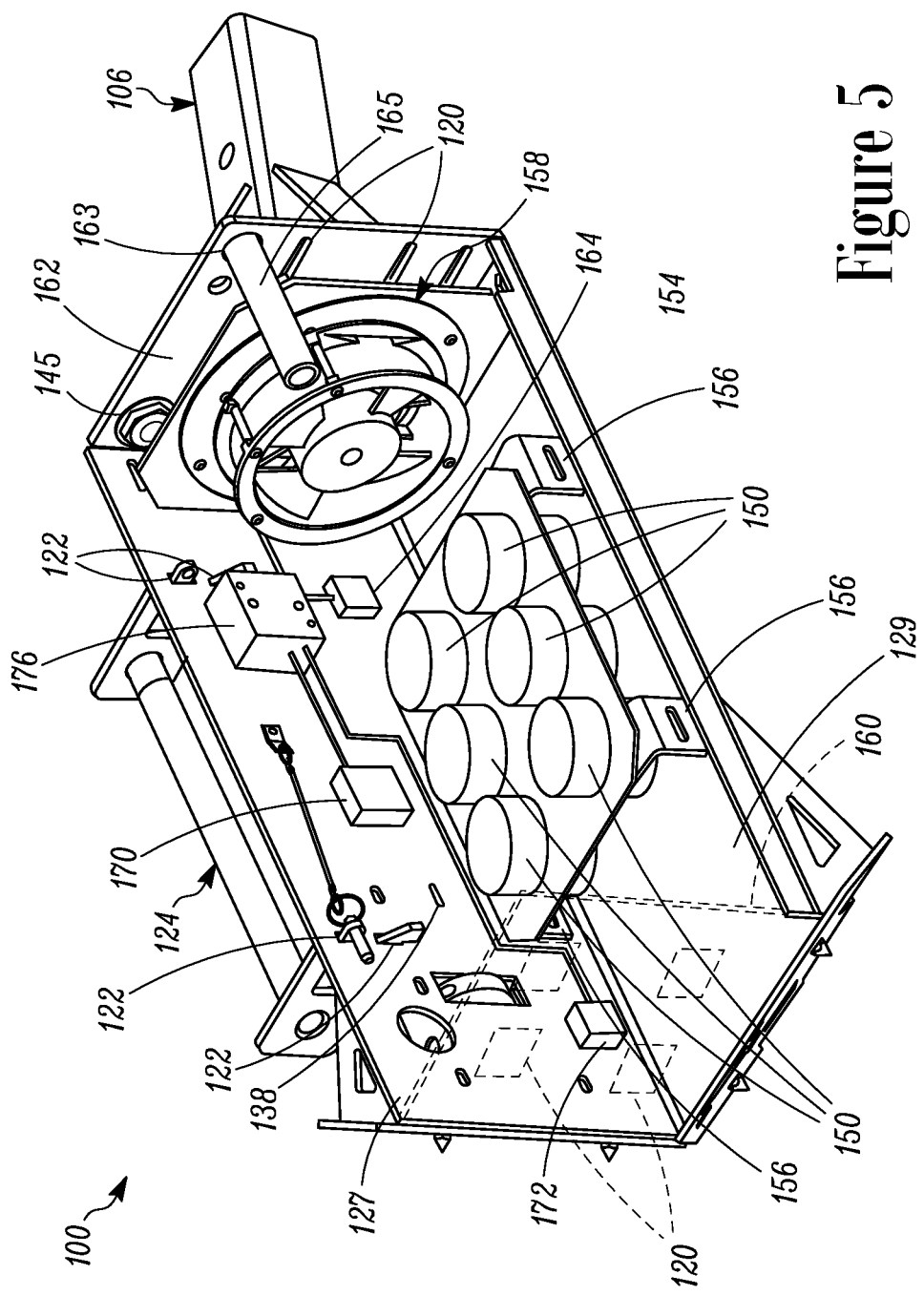
FIG. 5 is internal view of the gas delivery device without a top and side.

The housing 102 also includes ports 120. The ports 120 allow ventilation of the interior of the housing 102. As shown in FIG. 5, a front 160 of the housing 102 (shown in FIG. 5) and a back 162 of the housing 102 (also include ports 120. The front 160 of the housing 102 is shown in dashes in FIG. 5 so that the interior of the housing 102 is not obscured. It will be appreciated that the number of ports 120 for the housing 120 can be one or more and can vary as is suitable and/or desired to provide adequate airflow to and/or from the interior of the housing 102. As shown in FIGS. 1 and 2, mounting slots 122 are included on each side 127 (an opposite side 127 is also shown, for example, in FIG. 5) of the housing 102. Each set of mounting slots 122 allows for a handle 124 to be removably attached to a side 127 of the housing 102. The handles 124 can be removed during the use of the gas delivery device 100, which prevents the handles 124 from being damaged. An embodiment of a gas delivery device 100 may include other types of removable handles than those shown in FIGS. 1 and 3-5. For example, the handles 124 may be removably attached by being bolted to the housing 102 such that they can be easily removed. The handles 124 provide, for example, easier hand-holds for moving the gas delivery device 100. The handles 124 can be used when attaching and removing the gas delivery device 100 from a vehicle (e.g., the vehicle 200 shown in FIG. 7).

Figure 7:
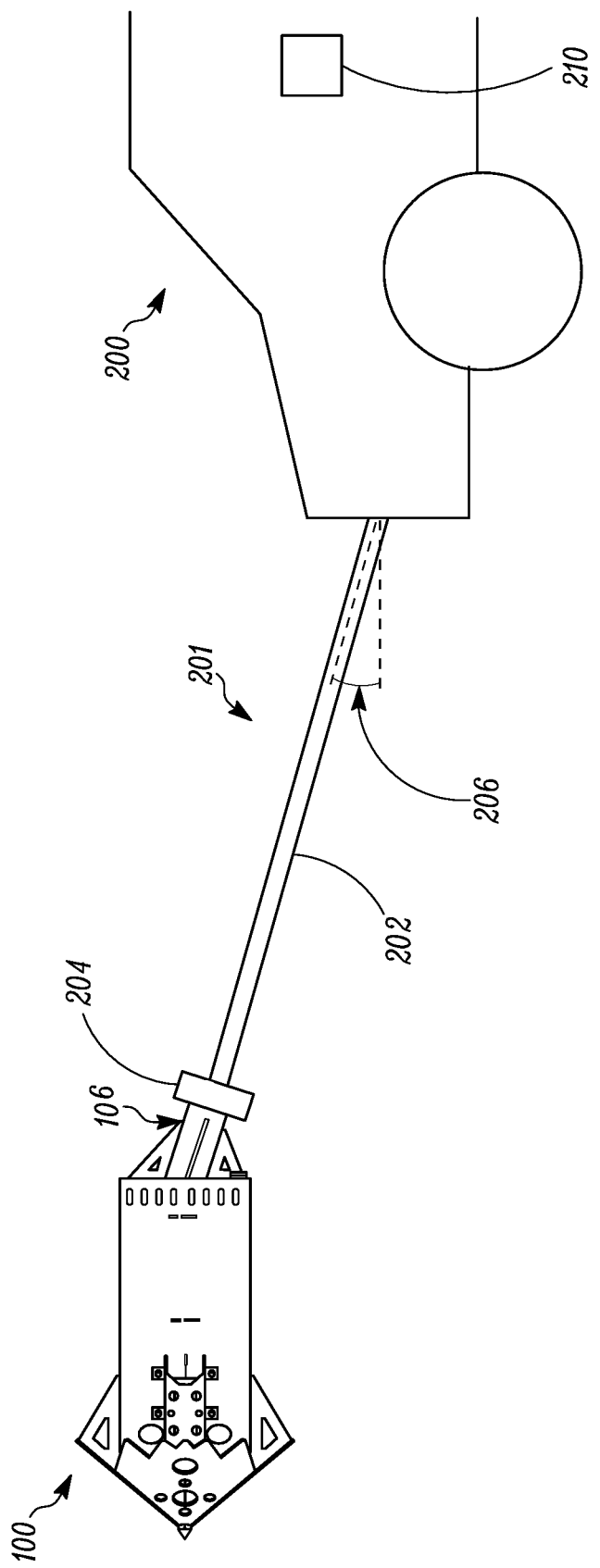
FIG. 7 shows a gas delivery device attached to a vehicle according to one embodiment.

The connecting member 106 provides a structure for attaching the gas delivery device 102 to a vehicle (e.g., the vehicle 200 shown in FIG. 7). The connecting member 106 has an angle 140 relative to the housing 102 as shown in FIG. 2. It will be appreciated that the degree of the angle 140 of the connecting member 106 relative to the housing 102 can vary as desired and/or suitable. For example, the angle 140 may be based on an attachment mechanism (e.g., the attachment mechanism 201 shown in FIG. 7) of a specific vehicle that the gas delivery device 100 is attached to. In some embodiments, the connecting member 106 may not be angled.

The connecting member 106 includes a through-hole 142 for attaching the connecting member 106 to an attachment mechanism of a vehicle. The attachment of the gas delivery device 100 and connecting member 106 to a vehicle is described in more detail below regarding FIG. 7. It will be appreciated that in other embodiments, the gas delivery device 100 may include a different attachment structure than the connecting member 106.

The gas delivery device 100 includes the insertion head 104 that is affixed to a front portion of the housing 102. The insertion head 104 may be, for example, affixed to the housing 102 by being welded to one or more of the sides 127, top 128, bottom 129, and front 160 of the housing 102 in an embodiment. The insertion head 104 has a tapered shape. When the gas delivery device 100 is being inserted into a structure, this tapered shape can allow the gas delivery device 100 to more easily pierce a surface (e.g., a window, a wall) of the structure. The insertion head 104 can also protect the housing 102 and a NFDD ("noise-flash diversionary device") shroud 130. The insertion head 104 may also prevent larger structural debris from entering the ports 120 of the housing 102. The insertion head 104 has a pyramid shape in this embodiment. However, in other embodiments, the insertion head 104 may have other shapes that, for example, allow the gas delivery device 100 to more easily pierce a structure.

The insertion head 104 includes a main breaker tip 112 and secondary breaker tips 114. The main breaker tip 112 provides a hardened projection for piercing the materials (e.g., a wall, window) of a structure. For example, the main breaker tip 112 in an embodiment is configured to pierce hard surfaces such a wood, glass, concreate, plaster, drywall, and/or other light gauge metals. The secondary breaker tips 114 are projections that provide a hardened projection for breaking through a material of a structure. For example, the secondary breaker tips 114 may be utilized to break through glass. In the embodiment shown in FIGS. 1-3, the breaker tips 112, 114 can be made of steel or other various types of hardened materials.

The insertion head 104 also includes serrated edges 116 that project outward from the housing 102 and in a backward direction (e.g., in a direction opposite a direction A). The insertion head 104 is shaped so that a width (e.g., a dimension along a direction C) and a height (e.g., a dimension along a direction D) of the insertion head 104 are greater than a width and a height of the housing 102, respectively. The shape of insertion head 104 allows the serrated edges 114 to project outward from the housing 102. An operator may, for example, utilize the serrated edges 114 to catch and pull on portions of the structure (e.g., siding and/or a portion of a wall of a building) in a backward direction. Portions of the structure can then be removed by being hooked by the serrated edges 114 and pulled away from the structure to create an opening or communication portal in the structure. The serrated edges 114 in an embodiment may edges without serrations.

As shown in FIG. 2, gusset plates 126 provide support for the insertion head 104. In this embodiment, the insertion head 104 may be affixed to front portion of the housing 102 by one or more gusset plates 126. It will be appreciated that each gusset plate 126 may be attached to the insertion head 104 and one of the sides 127, bottom 129, or top 128 of the housing 102. As shown in FIGS. 1-3, one or more ports 123 are provided in each panel of the insertion head 104. The ports 123 allow for airflow through the insertion head 104. It will be appreciated that the number of ports 123 on the insertion head 104 can be one or more and can vary as suitable to, for example, provide adequate airflow through the insertion head 104 or provide an opening for a camera 172 (discussed below) and/or desired.

A shroud 130 is affixed to each side 127 of the housing 102 (a shroud for one side 127 is not shown). As shown in FIG. 2, a shroud 130 is affixed to the side 127 of the gas delivery device 102 by bolts 132. Each shroud is configured to hold a noise-flash diversionary device ("NFDD") 134. A NFDD 134 is known in the art. For example, A NFDD 134 can also be known as a stun grenade or flashbang grenade. The NFDD 134 is a non-lethal device that produces a flash of light and a sudden and intense sound (e.g., a sound greater than 170 dB) when initiated (e.g., ignited). The NFDD 134 is designed to be non-lethal and to not cause any permanent injuries to those exposed to it. In an embodiment, the gas delivery device 100 may include one or more NFDDs 134. In an embodiment, the shroud 130 may have a structure that is different than the one shown in FIGS. 1-4.

A connecting cord 136 is connected to the NFDD 134. The connecting cord 136 provides a means of initiating (e.g., igniting) the NFDD 134. The housing 102 includes an access port 138 so that the connecting cord 136 may travel inside the housing 102. In other embodiments, the connecting cord 136 may be secured along an outer surface of the housing 102 instead. The connecting cord 136 is discussed in more detail below.

FIG. 3 is a view of the top 128 of the gas delivery device 100 with the cover 108 attached. FIG. 4 is a view of an opening 148 in the top 128 of the gas delivery device 100 with the cover 108 removed. FIG. 5 is an internal view of the gas delivery device without a side 127 and a top 128. The front 160 is outlined is dashes so as to not obscure the internal view. The connecting cords 136, 152 (shown in FIGS. 2 and 4) are omitted in FIG. 5 to more clearly show internal configuration of the gas delivery device 100.

Referring to FIGS. 4 and 5, the gas delivery device includes a gas canister rack 154 for housing gas canisters 150. The gas canisters 150 can produce a gaseous chemical agent when initiated (e.g., ignited). A chemical agent includes chemical agents that are designed to create one or more non-permanent debilitating effects in a person. For example, such chemical agents may be those chemical agents known as less lethal chemical agents that are designed to not cause permanent harm. These chemical agents products designed deescalate a situation. For example, the chemical agent may be CS vapor, OC vapor, safe smoke, or the like. In an embodiment, a gas canister 150 may be in the form of an indoor baffled grenade. In an embodiment, the gas canister rack 154 may be configured to accommodate one or more gas canisters 150. In some embodiments, the gas canister rack 154 may be configured to accommodate two or more gas canisters 150. In some embodiments, the gas canister rack 154 may be configured to accommodate three or more gas canisters 150. In this embodiment, the gas canister rack 154 can accommodate six gas canisters 150. In some embodiments, the gas canister rack 154 can accommodate eight gas canisters 150. In some embodiments, the gas canister rack 154 can accommodate eight or more gas canisters 150.

The gas canister rack 154 securely holds each gas canister 150 within the housing 102. As shown in FIG. 5, the gas canister rack 154 is affixed to the sides 127 (only one side shown in FIG. 5) of the housing 102 by brackets 156. The gas canister rack 154 holds the gas canisters 150 so that the gas canisters 150 only contact the gas canister rack 154. Thus, the gas canisters 150 do not directly contact the housing 102. If the housing 102 becomes too hot during use, contact of the housing 102 against other objects may start a fire. However, as the gas canister rack 154 holds the gas canisters 150, any heat produced by the gas canisters 150 during their use is not directly transferred to the housing 102. This allows the gas delivery device 100 to more safely utilize gas canisters 150 that produce heat during use. It should be appreciated that gas canisters 150 that produce little or no heat during use may also be used in an embodiment. For example, in an embodiment, the gas canisters 150 may be non-burning and flameless baffled grenades. In an embodiment, the gas canisters 150 may be held by a different structure and/or mechanism than the gas canister rack 154.

As shown in FIG. 4, a plurality of connecting cords 152 are each connected to one of the gas canisters 150. Each connecting cord 152 is configured to initiate (e.g., ignite) a particular gas canister 150. In some embodiments, the connecting cords 136 for the NFDDs 134 may operate in a similar manner to the connecting cords 152 for the gas canisters 150. For example, in an embodiment, the connecting cords may all be made of shock tube. In some embodiments, one or more of the connecting cords 136, 152 may operate in a different manner than the other(s).

As shown in FIG. 5, the back 162 of the housing 102 includes an opening 163 with a cord guide 165. The connecting cords 136, 152 can be threaded through the cord guide 165 so that they exit the gas delivery device 100 through the back 162. For example, FIG. 3 illustrates an example of the connecting cords 136, 152 exiting the back 162 of the housing 102 in an embodiment. In some embodiments, the opening 163 may be provided without the cord guide 162. In some embodiments, the opening 163 may be located in the back 162 so that the connecting cords 163 travel through the connecting member 106.

Each connecting cord 136, 152 can be length of a shock tube. Shock tube may also be referred to as thermotube. Shock tube or thermotube is a non-electric explosive fuse used to transfer an ignition signal (e.g., an ignition flame or charge) to one of the gas canisters 150. Thus, providing a flame or ignition source to an end of the connecting cord 152 (e.g., an end opposite of the gas canister 150) can initiate (e.g., ignite) the corresponding gas canister 150. Shock tube includes tubing filled with an explosive powder such as, for example but not limited to, black powder. When initiated, flame propagates through black powder at 6500 feet per second. The tubing and explosive powder (e.g., black powder) can be selected such that the tubing does not burst and/or explode when the explosive powder is ignited. In an embodiment, the shock tube is initiated by a primer cap or electric spark. In some embodiments, the connecting cord 136, 152 may be electrical wiring. In these embodiments, the connecting cord 152 may, for example, provide an electrical spark initiation to the corresponding gas canister 150 to ignite it.

The gas delivery device 100 may include a ventilation device 158 that blows or vents the chemical agent produced by one or more of the gas canisters 150 out of the housing 102. As shown in FIG. 5, the ventilation device 158 can be a fan that is provided within the housing 102. In some embodiments, the ventilation device 158 may be a high-pressure fan. In some embodiments, the ventilation device 158 may be a high-pressure gas tank (e.g., a compressed air cylinder) that stores pressurized gas (e.g., air). The high-pressure tank may release pressurized gas so that the chemical agent is dispersed from inside the interior of the housing 102.

The ventilation device 158 shown in FIG. 5 is configured to circulate air through the interior of the housing 102. The ventilation device 158 is provided towards a back portion of the housing 102 so that it blows towards the front 160 of the housing 102. The ventilation device 158 can blow air past the gas canisters 150 such that the chemical agent produced by one or more of the gas canisters 150 is blown out of the housing 102. The ventilation device 158 can provide a better dispersal of the chemical agent from the housing 102 and can help prevent the chemical agent from building up within the housing 102. For example, in an embodiment, the ventilation device may be a pressurized gas tank that releases a directed stream of air through the housing 102 such that the chemical agent produced by one or more of the gas canisters 150 is circulated (e.g., vented, or dispersed) out of the housing 102. It will be appreciated that in other embodiments, the ventilation device 158 may be located in a different location within the housing 108 than shown in FIG. 5.

The gas delivery device 100 also includes an electronic audio device 170. The electronic audio device 170 is a device that produces sound. In some embodiments, the electronic audio device 170 can be a hailer (e.g., a loudspeaker). The electronic audio device 170 allows an operator of the gas delivery device 100 to give oral messages and/or commands to a suspect in the vicinity of the gas delivery device 100. The operator may utilize the audio device 170 to give oral commands and/or messages to a suspect from a safe location (e.g., an armored vehicle). The electronic audio device 170 may be located near one of the ports 120 in the housing 102. In an embodiment, the electronic audio device 170 may be a siren or a long range acoustic device ("LRAD"). In some embodiments, the gas delivery device 100 may include more than one electronic audio device 170. In some embodiments, the gas delivery device 100 may include more than one type of electronic audio device 170.

The gas delivery device 100 also includes an electronic audio recording device 164. The electronic audio recording device 164 may be, for example, a microphone. The electronic audio recording device 164 can record sound near the gas delivery device 100. The electronic audio recording device 164 can allow an operator of the gas delivery device 100 to, for example, listen to the suspect from a safe location (e.g., an armored vehicle, a remote area). The electronic audio recording device 164 and the electronic audio device 170 may be utilized together to form a communication portal between the operator and the suspect.

Further, the gas delivery device 100 may include a detachable communication device (not shown). The communication device can be configured so that it may be easily removed from the gas delivery device 100. In some embodiments, the communication device may be remotely detached from the gas delivery device 100 by the operator. The communication device can allow a suspect to communicate with the operator. The detachable communication device may be, for example, a telephone, a hand-held radio, etc. In some embodiments, the communication device may be designed so that it can only contact the operator or other police or military personnel.

The gas delivery device 100 also includes a camera 172. The camera 172 shown in FIG. 5 is positioned near a port 120 of the housing so that the lens (not shown) of the camera 172 can look through the port 120. The camera 172 can captures pictures and/or video of the area surrounding the gas delivery device 100. The camera 172 cam allow an operator of the gas delivery device 100 to view the area around the gas delivery device 100 from a safe location (e.g., the armored vehicle). In some embodiments, the camera 172 may be a low-light and/or night vision camera. In some embodiments, the gas delivery device 100 may include one or more cameras 172. In these embodiments, the one or more cameras 172 may provide a 360 degree view of the area around the gas delivery device 100.

The gas delivery device 100 includes a power supply 176. The power supply 176 is electrically connected to each of the electronic devices (e.g., ventilation device 158, electronic audio recording device 164, audio device 170, camera 172) of the gas delivery device 100 by a wire. In an embodiment, a power source provides power to the gas delivery device 100. The power supply 176 may then distribute the correct power (e.g., current and voltage) to each of the electronic devices. The power source may be, for example, a vehicle to which the gas delivery device 100 is attached (e.g., vehicle 200 in FIG. 7), a battery located within the vehicle to which the gas delivery device 100 is attached (e.g., vehicle 200 in FIG. 7), etc.

As shown in FIGS. 3-5, the back 162 of the housing 102 includes a power connector 145. The power connector 145 is an external plug bulkhead panel mounted to the back 162 of the housing 162 for electrically connecting the power source to the power supply 176. The power connector 145 provides an easy manner to electrically connect the power source to the gas delivery device 100. To more clearly show the internal configuration of the gas delivery device 100, the wire connecting the power connector 145 to the power supply 176 is omitted in FIG. 5. For example, an external power cable (not shown) that is electrically connected to the power source is plugged into the power connector 145. As the power connector 145 is connected to the power supply, an electrical connection is formed (via the power connector 145) between the power source and the power supply 176. The power source may then provide power to the power supply 176, which then distributes the power to one or more of the electronic devices within the gas delivery device 100.

In an embodiment, audio and video produced by the electronic audio recording device 164 and/or camera 172 is transmitted to an external communication device that is outside the gas delivery device 100. In an embodiment, an external communication device may provide transmissions to the electronic audio device 170. For example, the external communication device may be a computer, mobile device, microphone, video screen. In an embodiment, an external communication device may be located within or as a part of the vehicle to which the gas delivery device 100 is attached (e.g., vehicle 200 in FIG. 7). For example, an external communication device 210 is shown in FIG. 7. In such an embodiment, an operator can issue vocal commands through the audio device 170, listen to the audio produced by the electronic audio recording device 164, and/or view the video produced by the camera 172 from a safe location (e.g., from within the vehicle 200 in FIG. 7).

The audio produced by the electronic audio recording device 164, audio for the audio device 170, and/or video produced by the camera 172 may be transmitted by a data cable. In an embodiment, the data cable may be provided in a similar manner as described for the power cables and wires. In some embodiments, the data cable and power cable can be combined into a single cable. In such embodiments, the power connector 145 may be configured for plugging in an external cable for providing power and transmitting data. In such an embodiment, the power supply 176 may be also be configured to receive audio and/or video produced by the electronic audio recording device 164 and/or camera 172 and transmit the received audio and/or video to an external communication device via the power connector 145. In such an embodiment, the power supply 176 may be configured to receive the audio transmissions (e.g., orders for a suspect) from the external communication device and transmit the received audio transmissions to the electronic audio device 170. It should be appreciated that the power cables and data cables may be provided separately. For example, one or more data cables may be provided to connect the external communication device to the electronic audio recording device 164, the audio device 170, and/or the camera 172. In some embodiments, one or more of the data cables and/or power cables within the housing 102 may be protected by a heat resistant cover to prevent the cables from being damaged by heat. In an embodiment, the heat resistant cover may be, for example, a wrap or shroud for the cables.

Alternatively, the audio produced by the electronic audio recording device 164, audio for the audio device 170, and/or video produced by the camera 172 may be transmitted wirelessly in an embodiment. For example, wireless transitions in an embodiment may be transmitted to and from a mobile command post via a local wireless mesh network. Each of the electronic devices (e.g., the electronic audio recording device 164, the audio device 170, the camera 172) may have its own wireless antenna or each electronic device may transmit via a single antenna (e.g., a wireless antenna included in the power supply 176, a wireless antenna included in the external communication device). As described below, the gas delivery device 100 may be a remote controlled drone or robot (as described below). In such an embodiment, the electronic devices may communicate and/or be controlled in the same manner used to control the remote controlled drone or robot.

Figure 6:
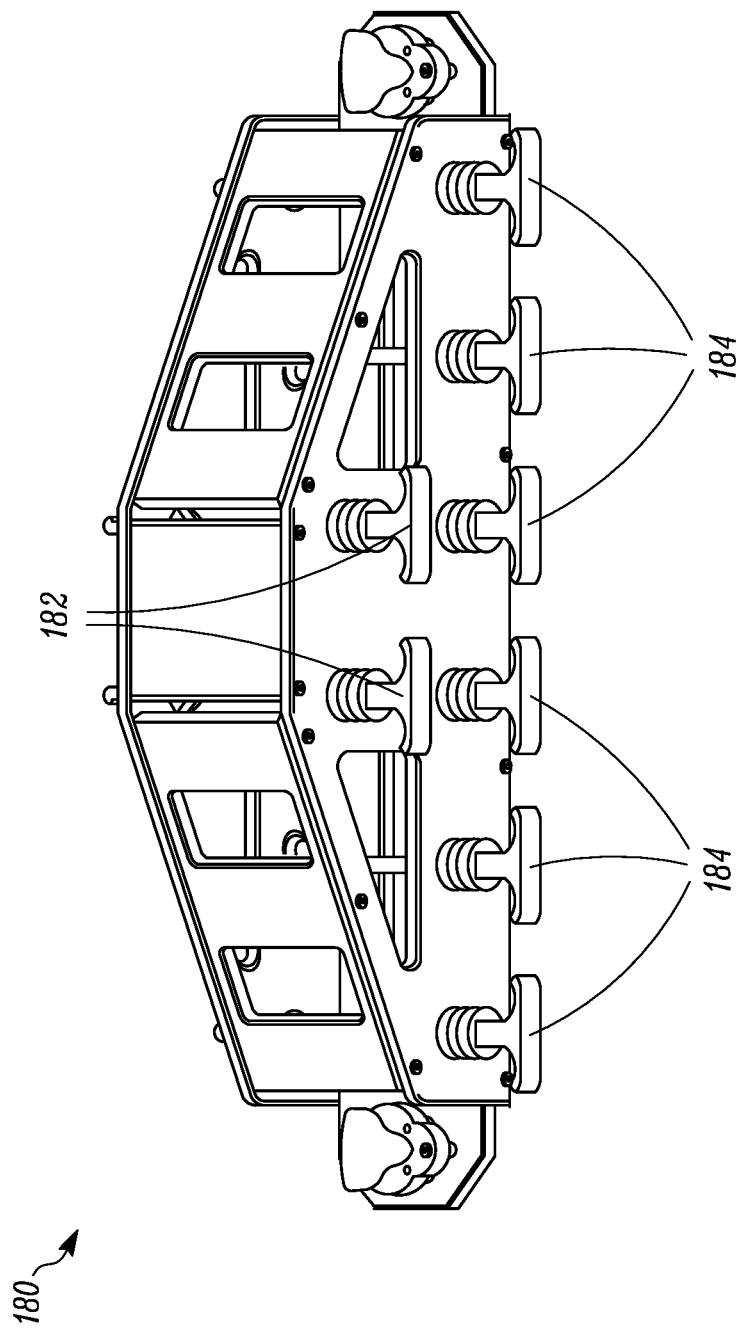
FIG. 6 shows a triggering mechanism for a gas delivery device according to one embodiment.

FIG. 6 shows an embodiment of a triggering mechanism 180 for the gas delivery device 100. A triggering mechanism 180 may be used to initiate (e.g., ignite) the NFDDs 136 and the gas canisters 150. The triggering mechanism 180 may be located in a safe location relative to the gas delivery device 100. For example, the triggering mechanism 180 may be located in the armored vehicle to which the gas delivery device 100 is attached. The triggering mechanism 180 includes a separate trigger 182 for each NFDD 136 and a separate trigger 184 for each gas canister 150. Each trigger 182 is connected to one of the NFDDs 134 by its respective connecting cord 136, and each trigger 184 is connected to one of the gas canisters 150 by its respective connecting cord 152.

Each trigger 182, 184 can include a charge (not shown) that ignites its corresponding connecting cord 136, 152. The charge may be, for example, a primer or other charge that may be ignited by contact. In some embodiments, the triggers 182, 184 may utilize an electrical spark instead of a charge to ignite their respective connecting cords 136, 152. As shown in FIG. 6, triggering device 180 includes 8 triggers 182, 184. In an embodiment, a gas delivery device may include 2 or more gas canisters 150 and one or more NFDDs 134. In such an embodiment, the triggering system 180 may include three or more triggers 182, 184 to allow each gas canister 150 and NFDD 134 to be triggered individually.

Each gas canister 150 and NFDD 134 can be individually initiated (e.g., ignited) using the triggering device 180 described above. In some embodiments, two or more gas canisters 150 may be initiated by one of the plurality of triggers 182,184. For example, in one embodiment, the gas delivery device 100 may include multiple types of chemical agents. Further, the embodiments may include and multiple gas canisters 150 of one type of chemical agents. In such an embodiment, one of the plurality of triggers 182, 184 may be configured to ignite two or more of the canisters 150 that produce a single type of chemical agent.

As discussed above, in some embodiments, the connecting cords 152 may each be an electrical wire instead of shock tube. In such embodiments, each trigger 182, 184 may ignite its respective NFDD 134 or gas canister 150 by providing an electrical current through a corresponding connecting cord 136, 152. Each of the triggers 182, 184 can be configured so that its actuation provides an electrical current through its respective connecting cord 136, 152. In such an embodiment, one or more of the triggers 182, 184 may be, for example, a button.

In some embodiments, the triggering device 180 may be a wireless device. In such embodiments, the triggering device 180 may be included in or on the housing 102. The triggering device 180 can include a wireless receiver (not shown). An operator may initiate one or more of the gas canisters 150 and/or the NFDDs 134 by sending a signal to the triggering device 180 that then triggers one or more corresponding gas canister(s) 150 and/or NFDD(s) 134.

FIG. 7 shows the gas delivery device 100 attached to a vehicle 200. The vehicle 200 shown in the embodiment is an armored truck. In other embodiments, the vehicle 200 may be any type of controllable vehicle. For example, the vehicle 200 may be another type of armored vehicle, such as an armored rook, tracked and/or untracked armored skid steer, a wheeled telescoping loader (which may also be known as a "LUL"), an armored or non-armored vehicle such as a remotely controlled drone, or a non-armored vehicle such as a pickup truck used for managing crowds (e.g., for crowd control during a riot). A remotely controlled drone may be armored or unarmored. A remotely controlled drone may be, for example, a ground vehicle or an unmanned aerial vehicle ("UAV"). It should be appreciated that a remotely controlled drone may also include other types of robots in an embodiment.

The gas delivery device 100 may be configured for use by a remotely controlled drone. For example, a gas delivery device 100 for a UAV may be configured to have a lower weight. The gas delivery device 100 may have a lower weight by, for example, being made of a lighter material, having a smaller internal volume, and/or accommodating a lower number of gas canisters (e.g., between two and five gas canisters 150, between two and four gas canisters 150, two or three gas canisters 150, only two gas canisters 150, etc.). For example, the gas delivery device 100 in an embodiment may be made of titanium, aluminum, carbon fiber to have a lower weight. The gas delivery device 100 is configured to have at least two gas canisters 150 as discussed above. For example, in operation, a remotely controlled ground drone may proceed through a building to approach a suspect that is barricaded in a room or area. For example, such remotely controlled ground drones have been previously employed for bomb detection and disposal. The gas delivery device 100 in an embodiment may be configured to be attached to and operate with a remotely controlled ground drone.

The remotely controlled drone may include a tool, such as a drill, to access the room with the suspect. In an embodiment, the gas delivery device 100 may be configured to funnel the chemical agent produced by the gas canisters 150 through a hole in a barricade (e.g., a door, a wall) so that the chemical agent produced within the housing 102 of the gas delivery device 100 is directed into the room and/or area with the barricaded suspect. The gas delivery device 100 in an embodiment may be configured so that the ventilation device 158 blows the chemical agent through one or more openings in the housing 102 and into the hole in the barricade. For example, the insertion head 104 in an embodiment may be replaced with a needle or funnel type structure. For example, the insertion head 104 may be modified to funnel gases through a hole in a barricade.

The gas delivery device 100 is attached to the vehicle 200 by an attachment mechanism 201. The attachment mechanism 201 has an extension arm 202 and a coupling device 204. The coupling device 204 couples the connecting member 106 to the extension arm 202 such that the gas delivery device 100 is affixed to extension arm 202. The coupling device 204 includes a pin (not shown). In one embodiment, the extension arm 202 can fit inside of the connecting part 206 and the pin can slide through both a through-hole 142 of the connecting member 204 and a through hole (not shown) of the extension arm 202. In some embodiments, the gas delivery device 100 may be attached to the extension arm 202 and the vehicle 200 in a different manner than described.

In some embodiments, the vehicle 200 can have the ability to adjust an angle 206 of the extension arm 202 so as to lower and raise the gas delivery device 100 relative to the vehicle 200. For example, the vehicle 200 in an embodiment may include hydraulics to adjust the angle 206 of the extension arm 202. An operator may utilize this ability to insert the gas delivery device 100 through a weak point of a structure. A weak of a structure may be, for example, a window of a structure.

When an armed suspect barricades themselves inside a structure (e.g., a vehicle, a house, a building), military and law enforcement personal need to act to detain the possibly dangerous suspect. However, the amount of force and the manner in which the amount of force was escalated can be called into question after an incident. The embodiments described herein allows for military and law enforcement personal to utilize a continuum of escalating force when responding to a barricaded suspect. The continuum of escalating force can provide a set system of reasonable escalations to the amount of force utilized against a suspect.

A continuum of escalating force describes incremental increases in the degrees of force used against a suspect. For example, an officer can utilize the audio device 170 to issue command/messages to the suspect (e.g., a response utilizing no force). If the suspect refuses to follow the commands or is unresponsive, then the officer can use a NFDD 136 and reissuing the command (e.g., a response utilizing a low amount of force). If the suspect still refuses to follow the commands or is unresponsive, the officer can then ignite one or more gas canisters 150 to release smoke within the structure (e.g., a response utilizing an intermediate level of force). If the suspect still refuses to follow the commands or is unresponsive, the officer can than ignite one or more canisters 150 to release a high-irritant chemical agent such as OC vapor or OC gas (e.g., a response utilizing an intermediate to high level of force). This can allow an officer to reasonably escalate the amount of force used against a suspect in steps so that the escalation of force is done in a reasonable manner.

While the disclosed gas delivery device has been described in conjunction with preferred embodiments, it will be obvious to one skilled in the art that other objects and refinements of the disclosed device may be made within the purview and scope of the disclosure.

Aspects

Any of aspects 1-9 may be combined with any of aspects 10-20, and any of aspects 10-17 may be combined with any of aspects 18-20.

Aspect 1. A gas delivery device configured to be inserted into a structure, the gas delivery device comprising:
 a housing including one or more ports for ventilation; and
 a canister rack configured to hold two or more chemical agent canisters, the canister rack disposed within the housing,
 wherein the gas delivery device is configured to be attached to a vehicle.

Aspect 2. The gas delivery device of aspect 1, wherein the two or more chemical agent canisters held by the canister rack produce one or more of CS vapor, OC vapor, and safe smoke.

Aspect 3. The gas delivery device of either aspect 1 or aspect 2, further comprising:
 a ventilation device configured to circulate chemical agent produced by one or more of the two or more chemical agent canisters out of the housing.

Aspect 4. The gas delivery device of any one of aspects 1-3, further comprising:
 a shroud attached to the housing, the shroud being configured to hold one or more of the noise-flash diversionary devices.

Aspect 5. The gas delivery device of any one of aspects 1-4, wherein the shrouds is located outside of the housing.

Aspect 6. The gas delivery device of any one of aspects 1-5, further comprising: an insertion head affixed to a front portion of the housing, the insertion head having a tapered structure.

Aspect 7. The gas delivery device of any one of aspects 1-6, further comprising:
 an electronic audio device that produces sound corresponding to an audio signal sent by an operator.

Aspect 8. The gas delivery device of any one of aspects 1-7, further comprising:
 an electronic audio recording device that records sounds near the gas delivery device.

Aspect 9. The gas delivery device of any one of aspects 1-8, further comprising:
 one or more cameras located within the housing, the one or more cameras being configured to view at least a portion of the area surrounding the gas delivery device.

Aspect 10. A gas delivery apparatus comprising:
 a gas delivery device including a housing and a canister rack disposed within the housing, the housing including one or more ports for ventilation, and the canister rack being configured to hold two or more chemical agent canisters; and
 a triggering device configured to initiate the two or more canisters held by the canister rack, wherein
 the gas delivery device is configured to be attached to a vehicle.

Aspect 11. The gas delivery apparatus of aspect 10, wherein the two or more chemical agent canisters held by the canister rack produce one or more of CS vapor, OC vapor, and safe smoke.

Aspect 12. The gas delivery apparatus of either of aspects 10 or 11, further comprising:
 a ventilation device configured to circulate chemical agent produced by the two or more chemical agent canisters out of the housing.

Aspect 13. The gas delivery apparatus of any one of aspects 10-12, wherein the gas delivery device further includes a shroud configured to hold one or more noise-flash diversionary devices.

Aspect 14. The gas delivery apparatus of any one of aspects 10-13, wherein the triggering device includes three or more triggers, each trigger corresponding to one of the two or more chemical agent canisters and the one or more noise-flash diversionary devices, wherein the triggering device is configured to allow each of the two or more chemical agent canisters and the one or more noise-flash diversionary devices to be separately initiated.

Aspect 15. The gas delivery apparatus of any one of aspects 10-14, wherein the triggering apparatus includes a first trigger and a second trigger, a first trigger being configured to initiate at least two of the two or more chemical agent canisters, and a second trigger being configured to initiate at least one of the one or more noise-flash diversionary devices.

Aspect 16. The gas delivery apparatus of any one of aspects 10-15, wherein the triggering device is located on or in the vehicle.

Aspect 17. The gas delivery apparatus of any one of aspects 10-16, wherein the triggering device is a wireless device.

Aspect 18. A gas distributing vehicle, comprising:
a motor vehicle;
a gas delivery device attached to the motor vehicle, the gas delivery device including a housing and a canister rack disposed within the housing, the housing including one or more ports for ventilation, and the canister rack being configured to hold two or more chemical agent canisters.

Aspect 19. The gas distributing vehicle of aspect 18, further comprising: a triggering device configured to initiate the two or more chemical agent canisters held by the canister rack.

Aspect 20. The gas distributing vehicle of either of aspects 19 or 20, wherein the housing includes a shroud configured to contain one or more noise-flash diversionary devices, and the triggering device is further configured to initiate the one or more noise-flash diversionary devices.

The disclosure, in its various aspects and disclosed forms, is well adapted to the attainment of the stated objects and advantages of others. The disclosed details are not to be taken as limitations on the claims.

What is claimed is:

1. A gas delivery device configured to be inserted into a structure, the gas delivery device comprising:
    a housing including one or more ports for ventilation; and
    a canister rack configured to hold two or more chemical agent canisters, the canister rack disposed within the housing,
    wherein the gas delivery device is configured to be attached to a vehicle.

2. The gas delivery device of claim 1, wherein the two or more chemical agent canisters held by the canister rack produce one or more of CS vapor, OC vapor, and safe smoke.

3. The gas delivery device of claim 1, further comprising:
    a ventilation device configured to circulate chemical agent produced by one or more of the two or more chemical agent canisters out of the housing.

4. The gas delivery device of claim 1, further comprising:
    a shroud attached to the housing, the shroud being configured to hold one or more of the noise-flash diversionary devices.

5. The gas delivery device of claim 4, wherein the shrouds is located outside of the housing.

6. The gas delivery device of claim 1, further comprising:
    an insertion head affixed to a front portion of the housing, the insertion head having a tapered structure.

7. The gas delivery device of claim 1, further comprising:
    an electronic audio device that produces sound corresponding to an audio signal sent by an operator.

8. The gas delivery device of claim 1, further comprising:
    an electronic audio recording device that records sounds near the gas delivery device.

9. The gas delivery device of claim 1, further comprising:
    one or more cameras located within the housing, the one or more cameras being configured to view at least a portion of the area surrounding the gas delivery device.

10. A gas delivery apparatus comprising:
    a gas delivery device including a housing and a canister rack disposed within the housing, the housing including one or more ports for ventilation, and the canister rack being configured to hold two or more chemical agent canisters; and
    a triggering device configured to initiate the two or more canisters held by the canister rack, wherein
    the gas delivery device is configured to be attached to a vehicle.

11. The gas delivery apparatus of claim 10, wherein the two or more chemical agent canisters held by the canister rack produce one or more of CS vapor, OC vapor, and safe smoke.

12. The gas delivery apparatus of claim 10, further comprising:
    a ventilation device configured to circulate chemical agent produced by the two or more chemical agent canisters out of the housing.

13. The gas delivery apparatus of claim 10, wherein the gas delivery device further includes a shroud configured to hold one or more noise-flash diversionary devices.

14. The gas delivery apparatus of claim 13, wherein the triggering device includes three or more triggers, each trigger corresponding to one of the two or more chemical agent canisters and the one or more noise-flash diversionary devices,
    wherein the triggering device is configured to allow each of the two or more chemical agent canisters and the one or more noise-flash diversionary devices to be separately initiated.

15. The gas delivery apparatus of claim 13, wherein the triggering apparatus includes a first trigger and a second trigger, a first trigger being configured to initiate at least two of the two or more chemical agent canisters, and a second trigger being configured to initiate at least one of the one or more noise-flash diversionary devices.

16. The gas delivery apparatus of claim 10, wherein the triggering device is located on or in the vehicle.

17. The gas delivery apparatus of claim 10, wherein the triggering device is a wireless device.

18. A gas distributing vehicle, comprising:
    a motor vehicle;
    a gas delivery device attached to the motor vehicle, the gas delivery device including a housing and a canister rack disposed within the housing, the housing including one or more ports for ventilation, and the canister rack being configured to hold two or more chemical agent canisters.

19. The gas distributing vehicle of claim 18, further comprising:
    a triggering device configured to initiate the two or more chemical agent canisters held by the canister rack.

20. The gas distributing vehicle of claim 19, wherein the housing includes a shroud configured to contain one or more noise-flash diversionary devices, and the triggering device is further configured to initiate the one or more noise-flash diversionary devices.

* * * * *